US006892795B1

(12) United States Patent
Steele

(10) Patent No.: US 6,892,795 B1
(45) Date of Patent: May 17, 2005

(54) EMBOSSED REGENERATOR MATRIX FOR HEAT EXCHANGER

(75) Inventor: Donald F. Steele, Cohasset, MA (US)

(73) Assignee: AirXchange, Inc., Rockland, MA (US)

( * ) Notice: Subject to any disclaimer, the term of this patent is extended or adjusted under 35 U.S.C. 154(b) by 0 days.

(21) Appl. No.: 09/679,116

(22) Filed: Oct. 4, 2000

(51) Int. Cl.[7] .............................................. F28D 17/00
(52) U.S. Cl. ................................ 165/10; 165/8; 165/9; 165/DIG. 399
(58) Field of Search ............................. 165/4, 6, 8, 9, 165/10, 166, DIG. 399

(56) References Cited

U.S. PATENT DOCUMENTS

| | | | | |
|---|---|---|---|---|
| 2,596,642 A | * | 5/1952 | Boestad ........................ | 165/10 |
| 2,696,976 A | * | 12/1954 | Boestad et al. ............... | 165/10 |
| 2,879,979 A | * | 3/1959 | Wheeler ...................... | 165/10 |
| 2,946,573 A | * | 7/1960 | Lindhagen et al. ........... | 165/10 |
| 3,229,763 A | * | 1/1966 | Rosenblad ................... | 165/166 |
| 3,373,798 A | * | 3/1968 | Brummett .................... | 165/10 |
| 3,463,222 A | * | 8/1969 | Grames ....................... | 165/166 |
| 3,493,040 A | * | 2/1970 | Davidson ........... | 165/DIG. 399 |
| 3,554,273 A | * | 1/1971 | Kritzler ....................... | 165/10 |
| 3,965,695 A | | 6/1976 | Rush et al. .................... | 62/271 |
| 4,432,409 A | | 2/1984 | Steele ........................... | 165/8 |
| 4,744,410 A | | 5/1988 | Groves | |
| 4,769,053 A | | 9/1988 | Fischer, Jr. .................. | 55/389 |
| 4,825,936 A | | 5/1989 | Hoagland et al. ............. | 165/8 |
| 4,875,520 A | | 10/1989 | Steele et al. .................. | 165/10 |
| 4,924,934 A | | 5/1990 | Steele ........................... | 165/8 |
| 5,002,116 A | | 3/1991 | Hoagland et al. ............. | 165/9 |
| 5,238,052 A | | 8/1993 | Chagnot | |
| 5,650,221 A | | 7/1997 | Belding et al. ............. | 442/417 |
| 5,899,261 A | | 5/1999 | Brzytwa et al. | |
| 5,937,933 A | | 8/1999 | Steele et al. .................. | 165/10 |
| 5,979,050 A | | 11/1999 | Counterman et al. | |
| 6,013,385 A | | 1/2000 | DuBose ....................... | 429/17 |
| 6,145,582 A | * | 11/2000 | Bolle et al. ................... | 165/10 |
| 6,179,276 B1 | * | 1/2001 | Chen et al. ................... | 165/10 |

FOREIGN PATENT DOCUMENTS

CA   1200237   2/1986

* cited by examiner

Primary Examiner—Christopher Atkinson
(74) Attorney, Agent, or Firm—McDermott Will & Emery LLP

(57) ABSTRACT

A regenerator matrix for effecting the transfer of heat between two counter-flowing air streams separated in part by face seals. The matrix includes strips of material wound about an axis so as to provide a plurality of layers. The matrix also includes embossments located on at least some of the layers and providing interlayer spaces between at least some of the layers, such that the interlayer spaces extend through the matrix substantially parallel to the axis. The embossments have a uniform height and include primary and secondary embossments. The primary embossments extend substantially parallel to the axis to divide the interlayer spaces into gas passageways and substantially resist circumferential gas leakage between the gas passageways. The primary embossments are also for aligning with the face seals to prevent circumferential gas leakage between the two counter-flowing air streams, and are successively spaced so that at most two successive primary embossments will align with the face seals. The secondary embossments maintain the interlayer spaces at a substantially uniform spacing between the primary embossments, yet allow circumferential gas flow within the gas passageways.

14 Claims, 2 Drawing Sheets

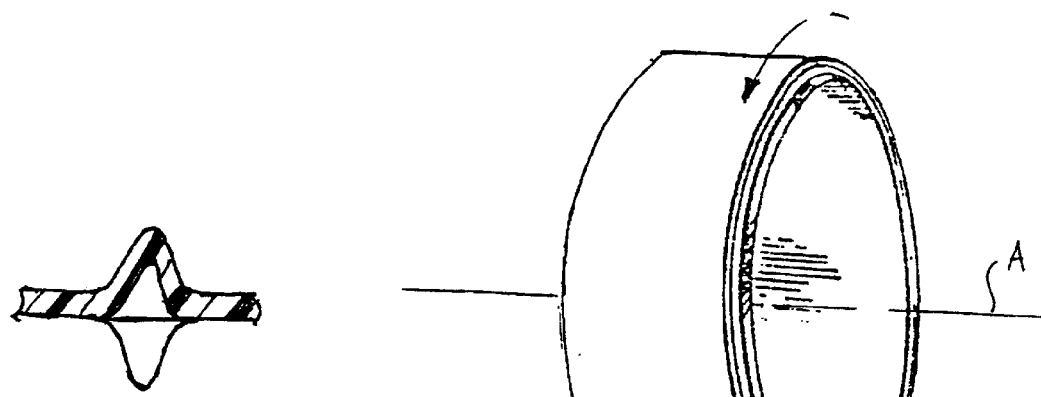
FIG. 6
FIG. 3
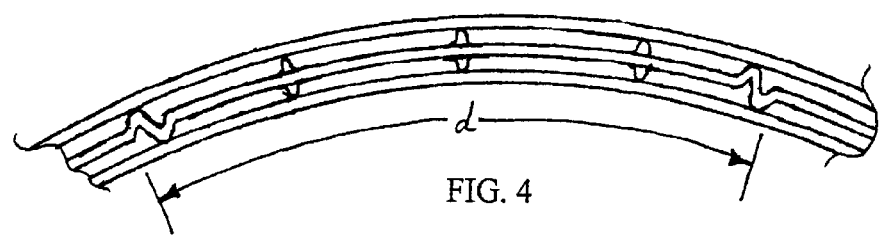
FIG. 4
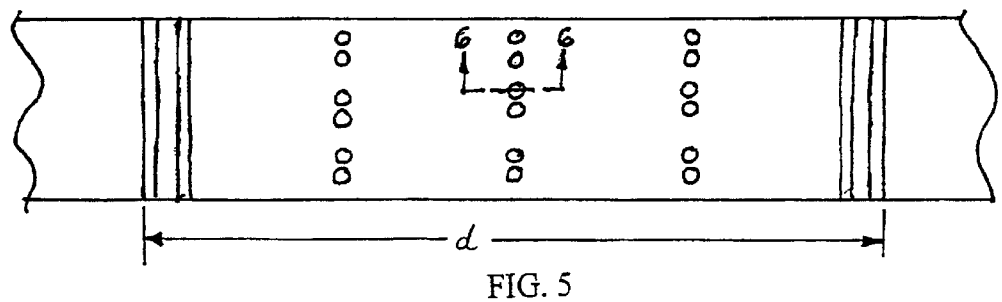
FIG. 5

EMBOSSED REGENERATOR MATRIX FOR HEAT EXCHANGER

BACKGROUND OF DISCLOSURE

1. Technical Field

The present disclosure relates generally to regenerative heat exchangers and, more particularly, to a rotary heat exchange wheel for transferring heat between two counter-flowing air streams. Even more particularly, the present disclosure relates to a regenerator matrix of a rotary heat exchange wheel having wound layers of smooth film spaced apart with a combination of dimples and elongated embossments.

2. Related Art

Regenerator heat exchange devices or regenerators are well known for effecting the transfer of heat and moisture between two counter-flowing air streams. Such heat exchange devices are used, for example, in heating, ventilation and cooling (HVAC) systems to conserve energy within buildings. One type of regenerator is the rotary air-to-air heat exchanger, which is typically in the form of a rotary heat exchange wheel including a matrix of heat exchange material. When rotated through counter-flowing air streams, the rotating wheel matrix is heated by the air stream with the higher temperature and, in turn, heats the lower temperature air stream. In addition, the rotating wheel may transfer moisture between the counter-flowing air streams. To promote moisture transfer, the wheel heat exchange matrix can be made from, or coated with, a moisture adsorbent desiccant material.

A matrix of a rotary heat exchange wheel can include strips of thin film material wound about an axis of the wheel so as to provide a plurality of layers. In such a design, the layers must have spacing means to create gas passageways extending through the wheel parallel with the axis. The layers must be uniformly spaced apart so that the gas passageways are of uniform height throughout their length for greatest efficiency.

Transverse elongated embossments have been provided in a plastic strip to form the gas passageways between the layers of the regenerator matrix. Numerous closely spaced transverse embossments are needed to maintain parallelism between layers if used alone to form the passageways. While such elongated embossments may maintain parallelism and prevent circumferential gas leakage, they replace parallel matrix surface area thereby reducing the heat exchange effectiveness of the regenerator.

For optimum heat and moisture transfer and from a manufacturing standpoint, it is easiest to merely provide dimples in the strip to form the gas passageways between the layers of the regenerator matrix. However, while dimples provide a desirable high aspect ratio between layers, they unfortunately allow appreciable circumferential gas leakage in those situations where there is a high pressure differential between the counter-flowing air streams, thereby reducing the heat exchange effectiveness of the regenerator.

Canadian Patent No. 1,200,237, which issued on Feb. 4, 1986 and is assigned to the assignee of the present disclosure, provides a regenerator matrix for use as a counter-flow heat regenerator. The matrix includes a wheel of plastic film strip material formed about a center axis of the wheel so as to provide a plurality of layers of the film material. At least some of the layers include elongated embossments extending substantially parallel to the axis of the wheel, with alternate embossments protruding from opposite surfaces of the strip material.

The transverse embossments provide spaces between layers of the film material and define passageways for gas passing through the matrix parallel to the center axis. The embossments have a total length less than the width of the strip and do not extend to the edges of the strip, but do manage to resist most circumferential gas leakage around the wheel. However, because the embossments do not extend to the edges of the strip they have closed ends that reduce the traverse area of the passageways. In one of the embodiments shown, the elongated embossments are discontinuous, while in another embodiment dimples are provided between the elongated embossments to maintain uniform spacing of the layers.

What is still desired is a new and improved regenerator matrix for a rotary heat exchange wheel that provides substantially no circumferential gas leakage-within the matrix, while still having a high heat exchange effectiveness.

SUMMARY OF DISCLOSURE

The present disclosure, accordingly, provides a regenerator matrix for effecting the transfer of heat and moisture between two counter-flowing air streams separated in part by face seals having a predetermined width. The matrix includes strips of material wound about an axis so as to provide a plurality of layers. The matrix also includes embossments located on at least some of the layers and providing interlayer spaces between at least some of the layers, such that the interlayer spaces extend through the matrix substantially parallel to the axis.

The embossments have a uniform height and include primary and secondary embossments. The primary embossments extend substantially parallel to the axis to divide the interlayer spaces into gas passageways and substantially resist circumferential gas leakage between the gas passageways. The primary embossments are also for aligning with the face seals to prevent circumferential gas leakage between the two counter-flowing air streams, and are successively spaced so that at most two successive primary embossments will align with the face seals. In this way, the total number of primary embossments are minimized while at least one of the primary embossments of each interlayer space is always aligned with each of the face seals to prevent circumferential gas leakage between the two counter-flowing air streams of the regenerator, and help to increase the heat exchange effectiveness of the matrix.

The secondary embossments maintain the interlayer spaces at a substantially uniform spacing between the primary embossments, yet allow circumferential gas flow within the gas passageways. The secondary embossments, therefore, also help to increase the heat exchange effectiveness of the matrix.

According to one aspect of the present disclosure, the primary embossments extend parallel with the axis and a length of each of the primary embossments is substantially equal to a width of the strip. According to another aspect, the secondary embossments comprise dimples. According to an additional aspect, two strips of material are wound about the axis, and one of the strips has primary and secondary embossments extending from opposing surfaces while the other strip is substantially free of embossments.

These and other features and benefits of the present disclosure will become more apparent upon reading the following detailed description in combination with the accompanying drawing figures.

BRIEF DESCRIPTION OF DRAWINGS

FIG. 3 is a perspective view of an embossed strip and an unembossed strip being wound to form the regenerator matrix of FIG. 1;

FIG. 4 is an enlarged view of a portion of the regenerator matrix of FIG. 1;

FIG. 5 is an enlarged plan view of a portion of the embossed strip of the regenerator matrix of FIG. 1; and FIG. 6 is a sectional view of the embossed strip taken along line 6—6 of FIG. 5.

DETAILED DESCRIPTION OF DISCLOSURE

Figure 1:
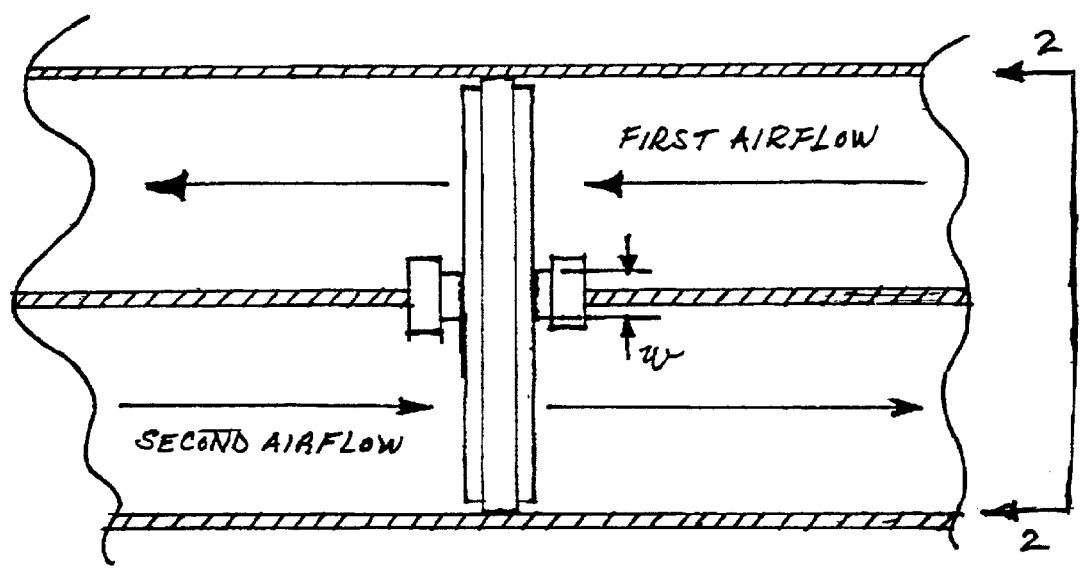
FIG. 1 is a side elevation view, partly in section, of an air-to-air heat exchanger including a rotary heat exchange wheel having a regenerator matrix constructed in accordance with the present disclosure.
Figure 2:
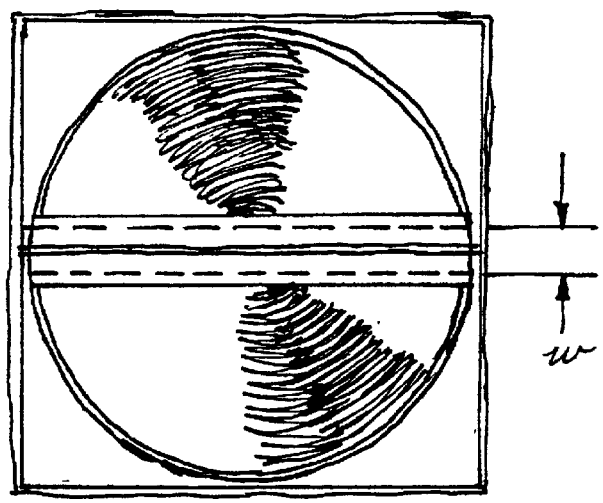
FIG. 2 is an end elevation view of the heat exchanger as seen from line 2—2 of FIG. 1.

Referring to FIGS. 1 and 2, the present disclosure provides a regenerator matrix 10 for use as part of a rotary heat exchange wheel 12 in a counter-flow heat exchanger, or regenerator 14. The matrix 10 effects the transfer of heat and moisture between two counter-flowing air streams separated in part by face seals 16 having a predetermined width "w".

As shown in FIGS. 1 and 2, the heat exchanger 14 includes an enclosure 18 having a flow chamber 20 and a counter-flow chamber 22 separated by a wall 24. A first airflow is received by the flow chamber 20, while a second airflow is received by the counter-flow chamber 22. As their names imply, the flow and counter-flow chambers 20, 22 direct the airflows in opposite directions.

The heat exchange wheel 12 is mounted within the enclosure 18 for simultaneous rotation through the flow chamber 20 and the counter-flow chamber 22, with an outer circumference of the wheel 12 forming a nearly air-tight seal between the wheel 12 and the enclosure 18. The face seals 16 prevent leakage between the wall 24 and first and second faces 26, 28 of the wheel 12. As shown in FIGS. 1 and 2, the face seals 16 are provided with a predetermined width "w".

The heat exchange wheel 12 includes passageways formed therein, as described in detail below, that extend between the faces 26, 28 of the wheel 12. Accordingly, the first airflow passes through the wheel 12 from the second face 28 to the first face 26, while the second airflow passes through the wheel 12 from the first face 26 to the second face 28. Ideally, the rotating heat exchange wheel 12 transfers heat from the warmer of the two airflows to the cooler of the two airflows and moisture from the more humid of the two airflows to the less humid of the two airflows.

Referring to FIGS. 3 and 4, the matrix 10 of the rotary heat exchange wheel 12 includes at least one strip 30 of a high molecular weight synthetic polymer, such as polystyrene or polycarbonate, spirally wound about an axis "A" so as to provide a plurality of layers 38. At least some of the layers 38 include embossments 34, 36 that provide interlayer spaces between at least some of the layers, such that the interlayer spaces extend through the matrix 10 substantially parallel to the axis "A".

Referring also to FIGS. 4 and 5, the embossments have a uniform height and include primary and secondary embossments 34, 36. The primary embossments 34 extend substantially parallel to the axis "A" to divide the interlayer spaces into gas passageways 40 and substantially resist circumferential gas leakage between the gas passageways 40. The primary embossments 34 also align with the face seals 16 of the regenerator 14 of FIGS. 1 and 2 to resist circumferential gas leakage between the two counter-flowing air streams as the matrix 10 rotates. The primary embossments 34 are successively spaced apart such that at most two successive primary embossments of each interlayer space ever align with the face seals 16.

In this way, the total number of primary embossments 34 are minimized while at least one, and no more than two successive primary embossments of each interlayer space are always aligned with each of the face seals 16 to prevent circumferential gas leakage between the two counter-flowing air streams of the regenerator 14 as the matrix rotates. The primary embossments 34 thus help to increase the heat exchange effectiveness of the matrix 10 by decreasing air leakage under the face seals.

Preferably, the primary embossments 34 are successively spaced a distance "d" not greater than the predetermined width "w" of the face seals 16. As shown best in FIG. 5, the distance "d" preferably extends between outermost portions of the primary embossments 34, to ensure that at least one of the primary embossments of each interlayer space is always aligned with each of the face seals 16. It should be noted that the distance "d" being not greater than the predetermined width "w" simply means that the primary embossments 34 should be spaced apart as far as possible, but not greater than the predetermined width "w" of the face seals 16. The Referring to FIG. 4 in particular, the secondary embossments 36 maintain the interlayer spaces at a substantially uniform spacing between the primary embossments 34, yet do very little else to effect airflow through the gas passageways 40, either circumferentially or axially. The secondary embossments 36, therefore, also help to increase the heat exchange effectiveness of the matrix 10 by maintaining this uniform spacing.

A regenerator matrix 10 constructed in accordance with the present disclosure has been found to have a heat transfer efficiency essentially equal to that of a regenerator of identical size having a matrix formed of strips having just embossments that provide uniform spacing but do not prevent circumferential leakage. A regenerator matrix 10 constructed in accordance with the present disclosure has also been found to have a heat transfer efficiency greater than a regenerator of identical size having a matrix formed of strips having elongated embossments in place of the rows of dimples for providing uniform spacing and preventing circumferential leakage.

As shown in FIGS. 3 through 5, the primary embossments 34 preferably extend between opposite edges of the strip 30, and thus between the opposite faces 26, 28 of the matrix 10. The primary embossments 34, therefore, have open ends allowing air to flow through the embossments as the air flows parallel with the axis "A". The primary embossments 34 also preferably extend parallel with the axis "A". However, the primary embossments could alternatively extend at an angle between the opposite edges of the strip, and could alternatively extend substantially, but not all the way, between the edges of the strip.

The primary embossments preferably comprise elongated ridges 34 extending between the edges of the strip 30. In the embodiment shown, the elongated ridges 34 of opposing surfaces of the strip 30 are joined into a single embossment formed in the strip. However, the elongated ridges 34 of opposing surfaces can be separated and spaced apart.

Also referring to FIG. 6, the secondary embossments preferably comprise dimples 36. The dimples 36 are provided in rows that extend parallel with the axis "A" and are uniformly spaced between the primary embossments 34. As shown, alternate dimples 36 in each row extend from opposite surfaces of the strip 30.

As shown best in FIG. 3, the "at least one" strip of material preferably comprises two strips 30, 32 of material wound about the axis "A", with one of the strips 30 provided with the primary and secondary embossments 34, 36 extending from opposing surfaces and the other strip 32 having no embossments. Although in the preferred embodiment shown, the embossments 34, 36 are provided on both sides of the one strip 30, it will be understood that if desired, both strips may be provided with embossments on only one surface, or a single strip can be wound, with the single strip having embossments on only one surface.

Since certain changes apparent to one skilled in the art can be made in the herein described embodiments of the present disclosure without departing from the scope thereof as defined in the appended claims, it is intended that all matter contained herein be interpreted in an illustrative and not a limiting sense.

What is claimed is:

1. A regenerator matrix movable between two counter-flowing air streams separated in part by at least one face seal having a predetermined width "w", the matrix comprising:
    at least one strip of material wound about an axis so as to provide a plurality of layers; and
    embossments located on at least some of the layers, wherein the embossments have a uniform height and include,
        primary embossments fully extending between sides of the matrix, wherein the primary embossments are successively spaced apart by a predetermined distance "d" less than the predetermined width "w" of the face seal, wherein the primary embossments extend parallel with the axis and a length of each of the primary embossments is substantially equal to a width of the strip, and
        secondary embossments positioned between the primary embossments, wherein the secondary embossments are arranged in rows extending parallel with the axis.

2. A matrix according to claim 1, wherein the strip of material comprises a plastic film.

3. A matrix according to claim 2, wherein the plastic film is selected from the group comprising polystyrene, polycarbonate, polyvinyl chloride, and polyethylene terephthalate polyester.

4. A matrix according to claim 1, wherein the secondary embossments comprise dimples.

5. A matrix according to claim 1, wherein two strips of material are wound about the axis, and one of the strips has primary and secondary embossments extending from opposing surfaces.

6. A matrix according to claim 5, wherein the other of the two strips of material is smooth.

7. A matrix according to claim 1, wherein the primary embossments extend from opposing surfaces of the strip of material.

8. A matrix according to claim 1, wherein the secondary embossments extend from opposing surfaces of the strip of material.

9. A rotary regenerator matrix positioned between two counter-flowing air streams separated by two opposing face seals each having a predetermined width "w", the matrix comprising at least a first strip of material wound about an axis of the matrix and including embossments on opposing surfaces thereof, the embossments having a substantially uniform height and including primary embossments fully extending between sides of the matrix and successively spaced apart by a predetermined distance "d" less than the predetermined width "w" of the face seals, and secondary embossments positioned between the primary embossments, wherein the primary embossments extend parallel with the axis and a length of each of the primary embossments is substantially equal to a width of the first strip, and the secondary embossments are arranged in rows extending parallel with the axis.

10. A matrix according to claim 9, wherein the first strip of material comprises a plastic film.

11. A matrix according to claim 10, wherein the plastic film is selected from the group comprising polystyrene, polycarbonate, polyvinyl chloride, and polyethylene terephthalate polyester.

12. A matrix according to claim 9, wherein the secondary embossments comprise dimples.

13. A matrix according to claim 9, further comprising a second strip of material wound with the first strip of material about the axis.

14. A matrix according to claim 13, wherein the second strip of material is substantially free of embossments.

* * * * *